United States Patent
Mohri et al.

(10) Patent No.: US 7,272,101 B2
(45) Date of Patent: Sep. 18, 2007

(54) OBJECTIVE LENS, OPTICAL HEAD AND OPTICAL INFORMATION RECORDING/REPRODUCING APPARATUS

(75) Inventors: Masanari Mohri, Kobe (JP); Yoshiaki Komma, Hirakata (JP); Hiroshi Yamamoto, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 651 days.

(21) Appl. No.: 10/663,596

(22) Filed: Sep. 16, 2003

(65) Prior Publication Data

US 2004/0081059 A1  Apr. 29, 2004

(30) Foreign Application Priority Data

Oct. 23, 2002  (JP) ............................. 2002-308230

(51) Int. Cl.
  *G11B 7/00* (2006.01)
  *G02B 27/02* (2006.01)
(52) U.S. Cl. ................. 369/112.23; 359/656; 359/719; 359/804
(58) Field of Classification Search ................ 359/804, 359/719, 656–659
See application file for complete search history.

(56) References Cited

U.S. PATENT DOCUMENTS 6,744,568 B2 * 6/2004 Kitamura et al. ...... 369/112.23
2002/0097508 A1 * 7/2002 Wada et al. ................ 359/804

OTHER PUBLICATIONS

Makoto Itonaga, (2001), "Optical design for compatible lens between DVD and the next generation video disk system", *Journal of the Magnetics Society of Japan*, vol. 25, No. 3-2, pp. 446-450.

* cited by examiner

*Primary Examiner*—William Korzuch
*Assistant Examiner*—Jorge L. Ortiz-Criado
(74) *Attorney, Agent, or Firm*—Hamre, Schumann, Mueller & Larson, P.C.

(57) ABSTRACT

A light beam emitted from a light source is focused by an objective lens onto an information recording surface of an optical information recording medium. The objective lens has a substantially truncated-cone-shaped portion on its surface on the side of the optical information recording medium. This makes it possible to prevent interference with a DVD-RAM cartridge and ensure optical compatibility with a BD and a DVD.

4 Claims, 3 Drawing Sheets

OBJECTIVE LENS, OPTICAL HEAD AND OPTICAL INFORMATION RECORDING/REPRODUCING APPARATUS

BACKGROUND OF THE INVENTION

1. Field of the Invention

The present invention relates to an objective lens used when recording or reproducing information optically with respect to a disc-like optical information recording medium. The present invention also relates to an optical head including this objective lens. Further, the present invention relates to an optical information recording/reproducing apparatus that includes this optical head and records or reproduces information with respect to an optical information recording medium.

2. Description of Related Art

In recent years, to meet the demand for larger disk capacity, the technology for increasing the density of disk information has been developed actively. In connection with this, CD specifications, DVD specifications, BD ("Blu-ray Disc", registered trademark) etc. have been suggested for a disk format.

In each of these specifications, an optical head is used for recording and reproducing information with respect to a disk. For achieving a higher density of the disk information, the wavelength of a semiconductor laser serving as a light source should be shortened and a numerical aperture (NA) of an objective lens should be raised in the optical head.

Moreover, in the optical head, compatibility for recording or reproducing has to be ensured among the disks of the above-noted specifications.

In response to the above, an optical head has been suggested in which the compatibility is ensured by one objective lens (in the following, the objective lens will be a single lens) (for example, see Journal of the Magnetics Society of Japan, 25, 449-450 (2001)). In the following, a conventional optical head achieving the compatibility will be described referring to the above-mentioned document.

FIG. 4 schematically shows how one common objective lens focuses light on information recording surfaces of two kinds of optical disks having different substrate thicknesses. In FIG. 4, numeral 101 denotes a Blu-ray Disc (hereinafter, referred to as "BD"), numeral 102 denotes a DVD, numeral 103 denotes an objective lens, and numeral 104 denotes a hologram element. Numeral 105 denotes a light beam having a wavelength of 405 nm, numeral 106 denotes a light beam having a wavelength of 650 nm, and numeral 107 denotes a center of the light beam. Further, WD11 indicates a working distance with respect to the BD 101, WD22 indicates a working distance with respect to the DVD 102, TH1 indicates a substrate thickness (0.1 mm) of the BD 101, and TH2 indicates a substrate thickness (0.6 mm) of the DVD 102. In FIG. 4, the left side of the center 107 of the light beam shows a cross-section illustrating how the light is focused on the BD 101, while the right side thereof shows a cross-section illustrating how the light is focused on the DVD 102.

The following is a description of how the light is focused on each disk. The objective lens 103 is designed based on optical specifications with respect to the BD 101, with a focal length of 2.5 mm, an optical numerical aperture (NA) of 0.75 and an outer diameter of 4.5 mm. The hologram element 104 is provided with a grid pattern so that zero-order diffraction light of the light beam 105 with a wavelength of 405 nm is focused on an information recording surface of the BD 101 via the objective lens 103 and +1-order diffraction light of the light beam 106 with a wavelength of 650 nm is focused on an information recording surface of the DVD 102 via the objective lens 103. Thus, the light beam 105 enters the objective lens 103 as a parallel light beam, travels across the working distance WD11 (=0.6 mm) and the substrate thickness TH1 and forms a desired light spot on the information recording surface of the BD 101. Also, the light beam 106 enters the objective lens 103 as a substantially divergent light beam, travels across the working distance WD22 and the substrate thickness TH2 and forms a desired light spot on the information recording surface of the DVD 102. In this case, the working distance WD22 is determined uniquely in terms of compatibility and, thus, WD22=0.5 mm.

From the optical standpoint, the conventional optical head has been described above. However, besides the bare disk, there also are disks contained in a cartridge (DVD-RAM specifications) as the DVD 102. Therefore, it also is necessary to ensure the compatibility with such disks.

The following description with reference to FIG. 5 is directed to a relative positional relationship between the DVD 102 contained in a cartridge and the conventional objective lens.

In FIG. 5, numeral 108 denotes a center axis (an axis of rotation) of the DVD 102, numeral 103a denotes an upper surface of an edge of the objective lens 103, numeral 121 denotes a cartridge for DVD-RAM, and numeral 121a denotes a bridge provided on an outer peripheral side of a shutter opening of the cartridge 121. R1 indicates an inner-bridge-surface radius (60.8 mm) from the disk center axis 108 to an inner peripheral surface of the bridge 121a, R2 indicates an outermost-track radius (59 mm) of the DVD 102, D1 indicates a bridge step (0.75 mm), which is a distance along the direction of the disk center axis 108 between a lower surface of the DVD 102 and a lower surface of the bridge 121a, and D2 indicates a height of a lens surface (0.15 mm), which is the distance along the direction of the disk center axis 108 between an uppermost point of the upper surface of the objective lens 103 and the upper edge surface 103a thereof.

However, when D3 is a dimension of a space along the direction of the disk center axis 108 between the lower surface of the bridge 121a and the upper edge surface 103a, the above-noted dimension condition yields $$D3 = WD22 + D2 - D1$$
$$= 0.5 \text{ mm} + 0.15 \text{ mm} - 0.75 \text{ mm}$$
$$= -0.1 \text{ mm}.$$

Thus, the space dimension D3 is negative, so that the bridge 121a and the objective lens 103 interfere with each other as shown in FIG. 5. In other words, the compatibility with the DVD 102 contained in the cartridge cannot be achieved.

In the above-described conventional optical head, the objective lens 103 designed on the basis of optical specifications with respect to the BD 101 and the wavelength dependent hologram element 104 realize the optical compatibility with the BD 101 and the DVD 102 that have different substrate thicknesses.

However, there is a problem that the compatibility with the DVD 102 contained in the cartridge according to the DVD specifications cannot be achieved because of the interference between the objective lens 103 and the bridge 121a of the cartridge 121.

SUMMARY OF THE INVENTION

It is an object of the present invention to provide an objective lens that solves the problem of the conventional objective lens having the above-described optical compatibility and achieves compatibility also in terms of shape. It is a further object of the present invention to provide an optical head and an optical information recording/reproducing apparatus that achieve compatibility both optically and shape-wise.

In order to achieve the above-mentioned objects, an objective lens of the present invention is an objective lens for focusing a light beam emitted from a light source on an information recording surface of an optical information recording medium. The objective lens has a substantially truncated-cone-shaped portion on its surface on a side of the optical information recording medium.

Further, an optical head of the present invention includes a light source, an objective lens for focusing a light beam emitted from the light source on an information recording surface of an optical information recording medium, a plurality of optical elements, and an optical-electric conversion system. The objective lens is the above-mentioned objective lens of the present invention.

Moreover, an optical information recording/reproducing apparatus of the present invention includes an optical head for recording or reproducing information optically with respect to an optical information recording medium and records or reproduces desired information with respect to the optical information recording medium. The optical head is the above-mentioned optical head of the present invention.

DESCRIPTION OF THE PREFERRED EMBODIMENTS

In accordance with the present invention, it is possible to achieve an objective lens that ensures optical compatibility with a BD and a DVD and prevents the interference with a DVD-RAM cartridge.

Moreover, using this objective lens, it is possible to achieve an optical head and an optical information recording/reproducing apparatus that ensure the above-noted compatibility.

The following is a description of embodiments of the present invention, with reference to the accompanying drawings.

First Embodiment

Figure 1:
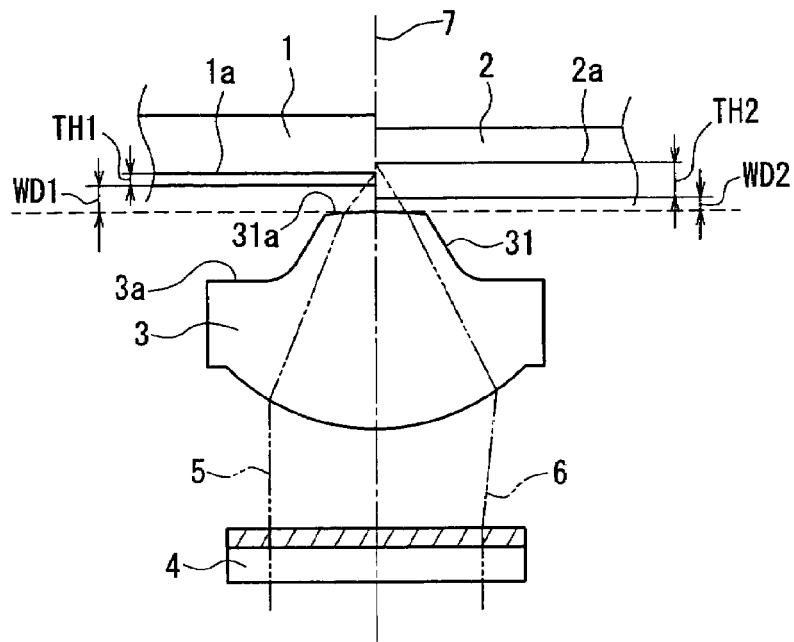
FIG. 1 schematically illustrates optical compatibility of an objective lens according to a first embodiment of the present invention with a BD and a DVD.

FIG. 1 schematically shows how one objective lens according to an embodiment of the present invention focuses light on information recording surfaces of two kinds of optical disks having different substrate thicknesses. In FIG. 1, numeral 1 denotes a Blu-ray Disc (hereinafter, referred to as "BD"), numeral 1a denotes an information recording surface of the BD 1, numeral 2 denotes a DVD, numeral 2a denotes an information recording surface of the DVD 2, numeral 3 denotes an objective lens, numeral 3a denotes an upper surface of an edge of the objective lens 3, and numeral 4 denotes a hologram element. Numeral 5 denotes a light beam having a wavelength of 405 nm, numeral 6 denotes a light beam having a wavelength of 650 nm, and numeral 7 denotes a center of the light beam. Further, WD1 indicates a working distance with respect to the BD 1, WD2 indicates a working distance with respect to the DVD 2, TH1 indicates a substrate thickness (0.1 mm) of the BD 1, and TH2 indicates a substrate thickness (0.6 mm) of the DVD 2. In FIG. 1, the left side of the center 7 of the light beam shows a cross-section illustrating how the light is focused on the BD 1, while the right side thereof shows a cross-section illustrating how the light is focused on the DVD 2.

The following is a description of how the light is focused on each disk.

The objective lens 3 has a substantially truncated-cone-shaped portion 31 on its surface on the side of the information recording surface of the disk. Here, the truncated cone refers to one including a base out of two objects obtained by cutting a circular cone into two along a plane parallel with the base. The cutting plane is called an upper surface of the truncated cone. The substantially truncated-cone-shaped portion 31 may be obtained by modifying the above-defined truncated cone slightly, for example, rounding off edges of the truncated cone.

The objective lens 3 is designed based on optical specifications with respect to the BD 1, with a focal length of 2.0 mm, an optical numerical aperture (NA) of 0.85 and an outer diameter of 4.5 mm. The hologram element 4 is provided with a grid pattern so that zero-order diffraction light of the light beam 5 with a wavelength of 405 nm is focused on the information recording surface 1a of the BD 1 via the objective lens 3 and +1-order diffraction light of the light beam 6 with a wavelength of 650 nm is focused on the information recording surface 2a of the DVD 2 via the objective lens 3. Thus, the light beam 5 from a light source (not shown) enters the objective lens 3 as a parallel light beam, passes through the substantially truncated-cone-shaped portion 31, leaves an upper surface 31a thereof, travels across the working distance WD1 (=0.4 mm) and the substrate thickness TH1 and forms a desired light spot on the information recording surface 1a of the BD 1. Also, the light beam 6 enters the objective lens 3 as a substantially divergent light beam, passes through the substantially truncated-cone-shaped portion 31, leaves the upper surface 31a thereof, travels across the working distance WD2 and the substrate thickness TH2 and forms a desired light spot on the information recording surface 2a of the DVD 2. In this case, the working distance WD2 is determined uniquely in terms of compatibility and, thus, WD2=0.3 mm. It is preferable that the upper surface 31a of the substantially truncated-cone-shaped portion 31 has a diameter larger than an effective diameter of the light beam 5 or 6 leaving this surface 31a. This prevents the light beam 5 or 6 from being shaded by a conical surface of the substantially truncated-cone-shaped portion 31.

In the above description, the compatibility has been discussed from the optical standpoint. Now, the following is a description of the compatibility with disks contained in a DVD cartridge (DVD-RAM specifications).

Figure 2:
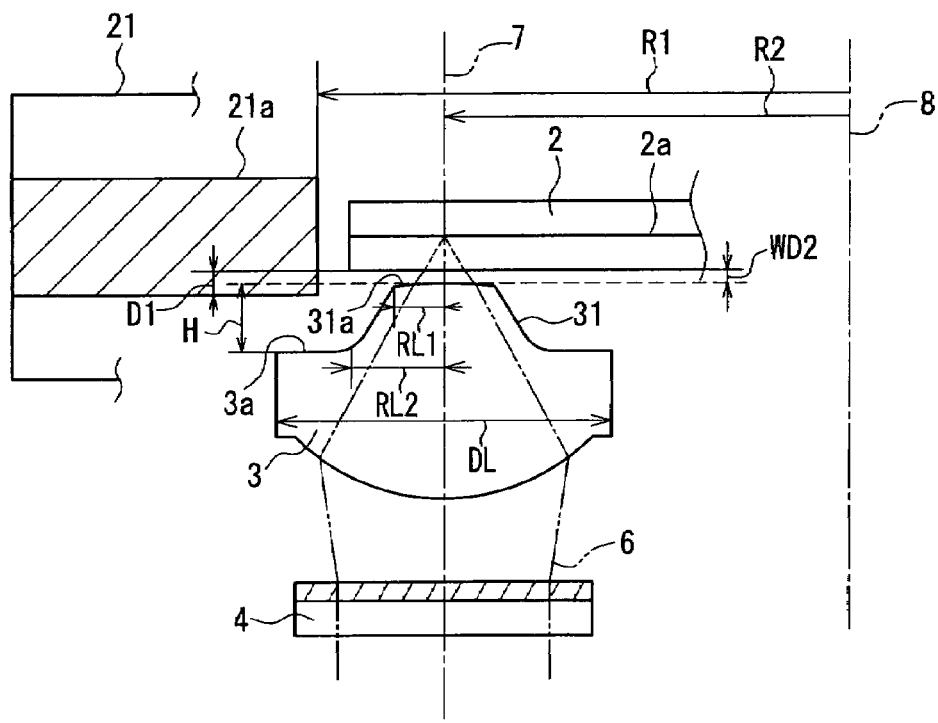
FIG. 2 schematically illustrates the relative positional relationship between the objective lens according to the first embodiment of the present invention and a DVD cartridge.

The following description with reference to FIG. 2 is directed to a relative positional relationship between the DVD 2 contained in a cartridge and an outer shape of the objective lens 3 of the present embodiment.

In FIG. 2, numeral 8 denotes a center axis (an axis of rotation) of the DVD 2, numeral 3*a* denotes an upper surface of an edge of the objective lens 3, numeral 21 denotes a cartridge for DVD-RAM, and numeral 21*a* denotes a bridge provided on an outer peripheral side of a shutter opening of the cartridge 21. R1 indicates an inner-bridge-surface radius (60.8 mm) from the disk center axis 8 to an inner peripheral surface of the bridge 21*a*, R2 indicates an outermost-track radius (59 mm) of the DVD 2, D1 indicates a bridge step (0.75 mm), which is a distance along the direction of the disk center axis 8 between a lower surface of the DVD 2 and a lower surface of the bridge 21*a*, RL1 indicates a radius of the upper surface 31*a* of the substantially truncated-cone-shaped portion 31 of the objective lens 3, RL2 indicates a radius of a virtual base of the substantially truncated-cone-shaped portion 31 of the objective lens 3, DL indicates an outer diameter (4.5 mm) of the objective lens 3, and H indicates a height of a lens surface, which is the distance along the direction of the disk center axis 8 between the upper surface 31*a* of the substantially truncated-cone-shaped portion 31 and the upper edge surface 3*a* of the objective lens 3.

In the present embodiment,

RL1=0.8 mm,

RL2=1.6 mm, and

H=1.0 mm.

The substantially truncated-cone-shaped portion 31 of the objective lens 3 has a shape of a truncated cone that narrows down toward a surface facing the DVD 2 (the upper surface 31*a*).

First, the interference between the objective lens 3 and the bridge 21*a* in a radial direction of the DVD 2 will be described.

In order to prevent the interference, the bridge 21*a* and the objective lens 3 have to satisfy the following dimensional relationship.

$R1 > R2 + RL2$

The substitution of the above-mentioned values into this formula yields 60.8 mm>59 mm+1.6 mm=60.6 mm, and thus the objective lens 3 of the present invention satisfies this formula.

Incidentally, although RL2 is 1.6 mm in the present embodiment, it is needless to say that the above formula holds as long as RL2<1.8 mm.

Next, the interference in a direction perpendicular to the surface of the DVD 2 will be described.

In order to prevent the interference, the bridge 21*a* and the objective lens 3 have to satisfy the following dimensional relationship. In the present embodiment, a movement amount FD of the objective lens 3 necessary for a focus control is 0.5 mm.

$H > D1 + FD - WD2 > 0$

The substitution of the above-mentioned values into this formula yields 1.0 mm>0.75 mm+0.5 mm−0.3 mm=0.95 mm>0, and thus the objective lens 3 of the present embodiment satisfies this formula.

Incidentally, although H is 1.0 mm in the present embodiment, it is needless to say that the above formula holds as long as H>0.95 mm.

As described above, in accordance with the present embodiment, by designing the shape of the objective lens 3 so as to satisfy RL2<1.8 mm, and H>0.95 mm, it is possible to achieve both optical and mechanical compatibilities with the DVD 2 contained in the cartridge.

Consequently, it is possible to achieve an objective lens that ensures optical compatibility with the BD 1 and the DVD 2 and prevents the interference with the DVD-RAM cartridge.

Second Embodiment

Figure 3:
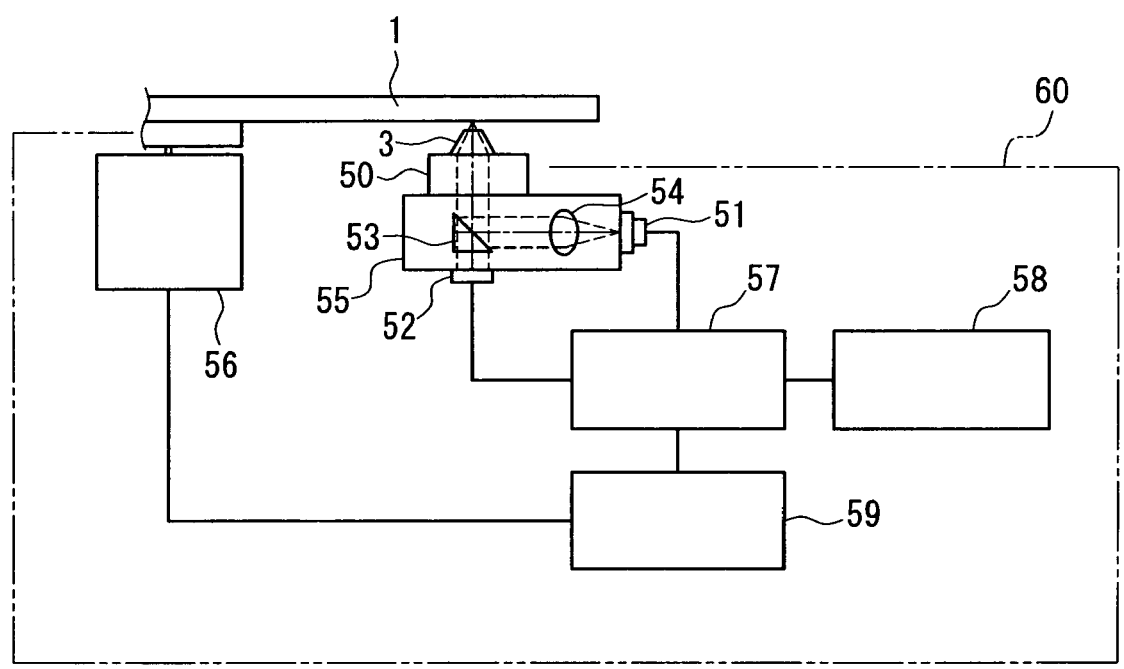
FIG. 3 shows a schematic configuration of an optical head and an optical information recording/reproducing apparatus according to a second embodiment of the present invention.
Figure 4:
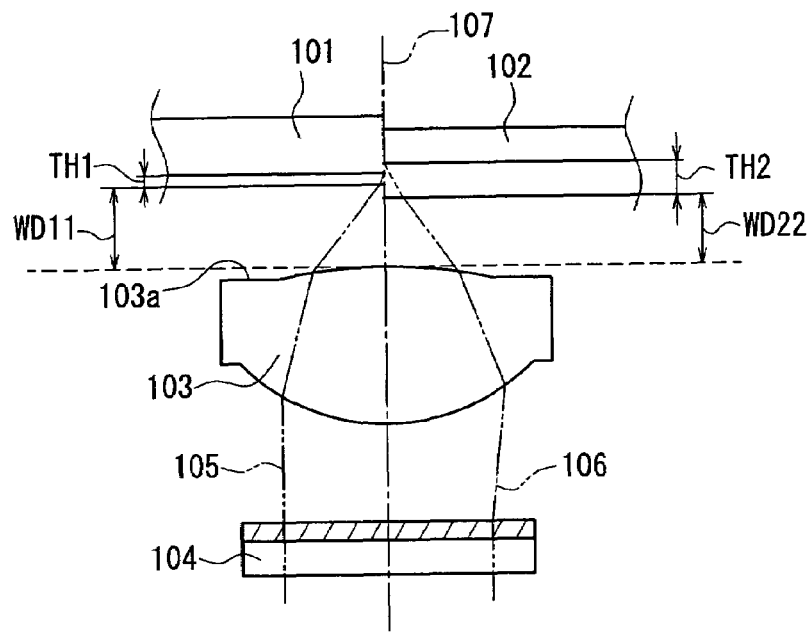
FIG. 4 schematically illustrates optical compatibility of a conventional objective lens with a BD and a DVD.
Figure 5:
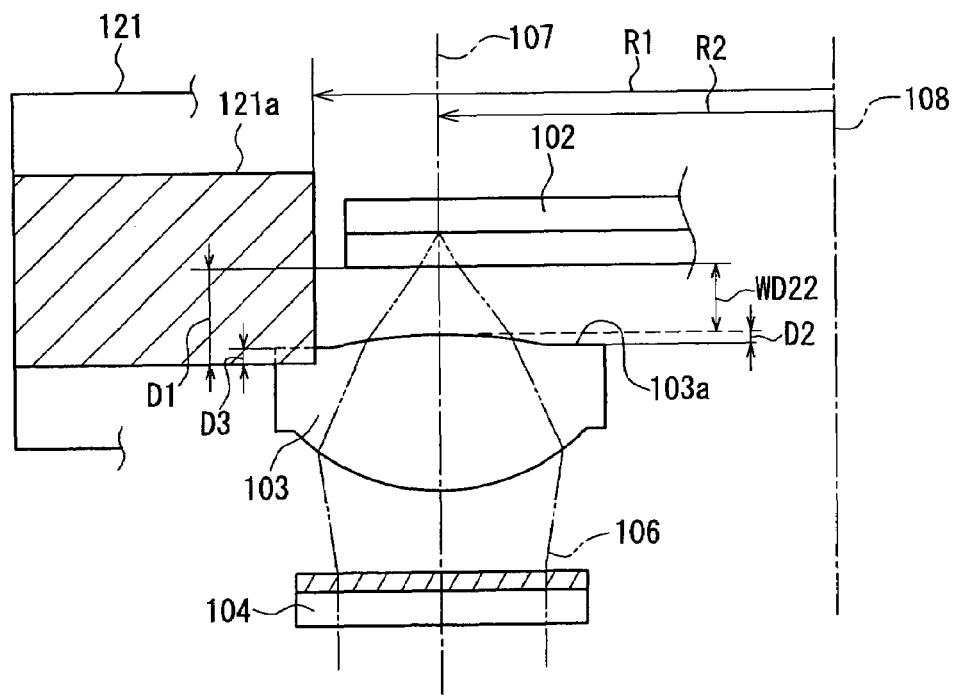
FIG. 5 schematically illustrates interference between the conventional objective lens and a DVD cartridge.

FIG. 3 shows a schematic configuration of an optical head and an optical information recording/reproducing apparatus according to an embodiment of the present invention. In FIG. 3, elements that are the same as those in FIG. 1 are assigned the same numerals, and the description thereof will be omitted.

In FIG. 3, numeral 50 denotes an objective lens driving device for driving the objective lens at least in a focusing direction and a tracking direction, numeral 51 denotes a semiconductor laser, numeral 52 denotes a photo-detector, numeral 53 denotes a mirror, numeral 54 denotes a collimator lens, and numeral 55 denotes an optical head including the semiconductor laser 51, the photo-detector 52, the mirror 53 and the collimator lens 54 etc. Numeral 56 denotes a spindle motor for rotating the BD 1 and the DVD 2 (not shown), numeral 57 denotes a control unit, numeral 58 denotes a signal processing unit, numeral 59 denotes a system control unit, and numeral 60 denotes an optical disk apparatus (an optical information recording/reproducing apparatus) including the optical head 55, the spindle motor 56, the control unit 57, the signal processing unit 58 and the system control unit 59 etc.

A light beam emitted from the semiconductor laser 51 serving as a light source is turned into a parallel light beam in the collimator lens 54, reflected by the mirror 53, passes through the hologram element 4 (not shown in this figure; see FIG. 1) and is focused by the objective lens 3 onto the information recording surface of the BD 1. The light beam reflected by the information recording surface passes through the objective lens 3, the hologram element 4 and the mirror 53, and enters the photo-detector 52 so as to be subjected to optical-electric conversion.

The objective lens 3 is the objective lens of the present invention described in the first embodiment, and therefore, using the above-described optical head 55, it becomes possible to record or reproduce information with respect to not only the BD 1 but also the DVD 2 with a common optical head. In other words, an optical head having compatibility with the BD 1 and the DVD 2 can be achieved.

A signal from the photo-detector 52 of the optical head 55 is converted into a desired information signal in the signal processing unit 58. Based on this information signal, the control unit 57 controls a light intensity of the semiconductor laser 51 and a detectivity of the photo-detector 52 and drives the objective lens driving device 50. The system control unit 59 controls the signal processing unit 58, the control unit 57 and the spindle motor 56 described above.

Since the optical disk apparatus 60 as described above includes the optical head 55 on which the objective lens 3 of the present invention is mounted, it is possible to achieve an optical information recording/reproducing apparatus that records or reproduces desired information while having compatibility with the BD 1 and the DVD 2.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An objective lens for focusing a light beam emitted from a light source on an information recording surface of an optical information recording medium, wherein the objective lens has an upper surface of an edge and a substantially truncated-cone-shaped portion projecting from the upper surface of the edge on its surface on a side of the optical information recording medium;

wherein a base of the substantially truncated cone-shaped portion of the objective lens has a radius RL2 smaller than 1.8 mm, and a height H of the substantially truncated-cone-shaped portion satisfies height H>0.75 mm+necessary movement amount FD of lens-working distance (WD).

2. The objective lens according to claim 1, wherein the light beam passes through the substantially truncated-cone-shaped portion, and an upper surface of the substantially truncated-cone-shaped portion has a diameter larger than an effective diameter of the light beam passing through the upper surface.

3. An optical head comprising:

a light source;

an objective lens for focusing a light beam emitted from the light source on an information recording surface of an optical information recording medium;

a plurality of optical elements; and an optical-electric conversion system;

wherein the objective lens is the objective lens according to claim 1.

4. An optical information recording/reproducing apparatus, which comprises an optical head for recording or reproducing information optically with respect to an optical information recording medium and records or reproduces desired information with respect to the optical information recording medium, wherein the optical head is the optical head according to claim 3.

* * * * *

UNITED STATES PATENT AND TRADEMARK OFFICE
CERTIFICATE OF CORRECTION

PATENT NO.         : 7,272,101 B2
APPLICATION NO.    : 10/663596
DATED              : September 18, 2007
INVENTOR(S)        : Mohri et al.

It is certified that error appears in the above-identified patent and that said Letters Patent is hereby corrected as shown below:

Column 8, line 2: "radius RL2" should read --radius (RL2)--.
Column 8, line 3: "height H" should read --height (H)--.
Column 8, line 5: "movement amount FD" should read --movement amount (FD)--.

Signed and Sealed this

First Day of July, 2008

JON W. DUDAS
*Director of the United States Patent and Trademark Office*